US010170971B1

(12) United States Patent
Yeakley et al.

(10) Patent No.: US 10,170,971 B1
(45) Date of Patent: Jan. 1, 2019

(54) DUAL POLE DUAL BUCKING MAGNET LINEAR ACTUATOR

(71) Applicant: Oracle International Corporation, Redwood Shores, CA (US)

(72) Inventors: Darryl Yeakley, Erie, CO (US); Frank Goodknight, Niwot, CO (US); Steven Suttle, Broomfield, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/640,317

(22) Filed: Jun. 30, 2017

(51) Int. Cl.
*H02K 41/00* (2006.01)
*H02K 41/035* (2006.01)
*H02P 25/06* (2016.01)

(52) U.S. Cl.
CPC ......... *H02K 41/0356* (2013.01); *H02P 25/06* (2013.01)

(58) Field of Classification Search
CPC ..................................................... H02K 35/04
See application file for complete search history.

(56) References Cited

U.S. PATENT DOCUMENTS

| 5,621,591 | A | 4/1997 | Rahimi et al. | |
| 5,931,676 | A * | 8/1999 | Honkura | A61C 13/235 |
| | | | | 433/189 |
| 6,194,796 | B1 | 2/2001 | Yeakley | |
| 8,422,173 | B2 | 4/2013 | Yeakley et al. | |
| 2007/0147197 | A1 * | 6/2007 | Huang | G11B 7/0933 |
| | | | | 369/44.15 |

* cited by examiner

*Primary Examiner* — Karen Masih
(74) *Attorney, Agent, or Firm* — Invoke

(57) ABSTRACT

A linear actuator includes dual bucking magnets, dual pole pieces, and dual spacers. The linear actuator includes a coil-and-housing assembly disposed around a magnet assembly. The magnet assembly includes two bucking magnets sandwiched around a central magnet. The central magnet and the bucking magnets may be separated by spacers. A housing is disposed around the magnet assembly. Between the housing and the magnet assembly, a dual coil is wound in two opposing directions to generate additive forces on the magnet assembly.

20 Claims, 6 Drawing Sheets

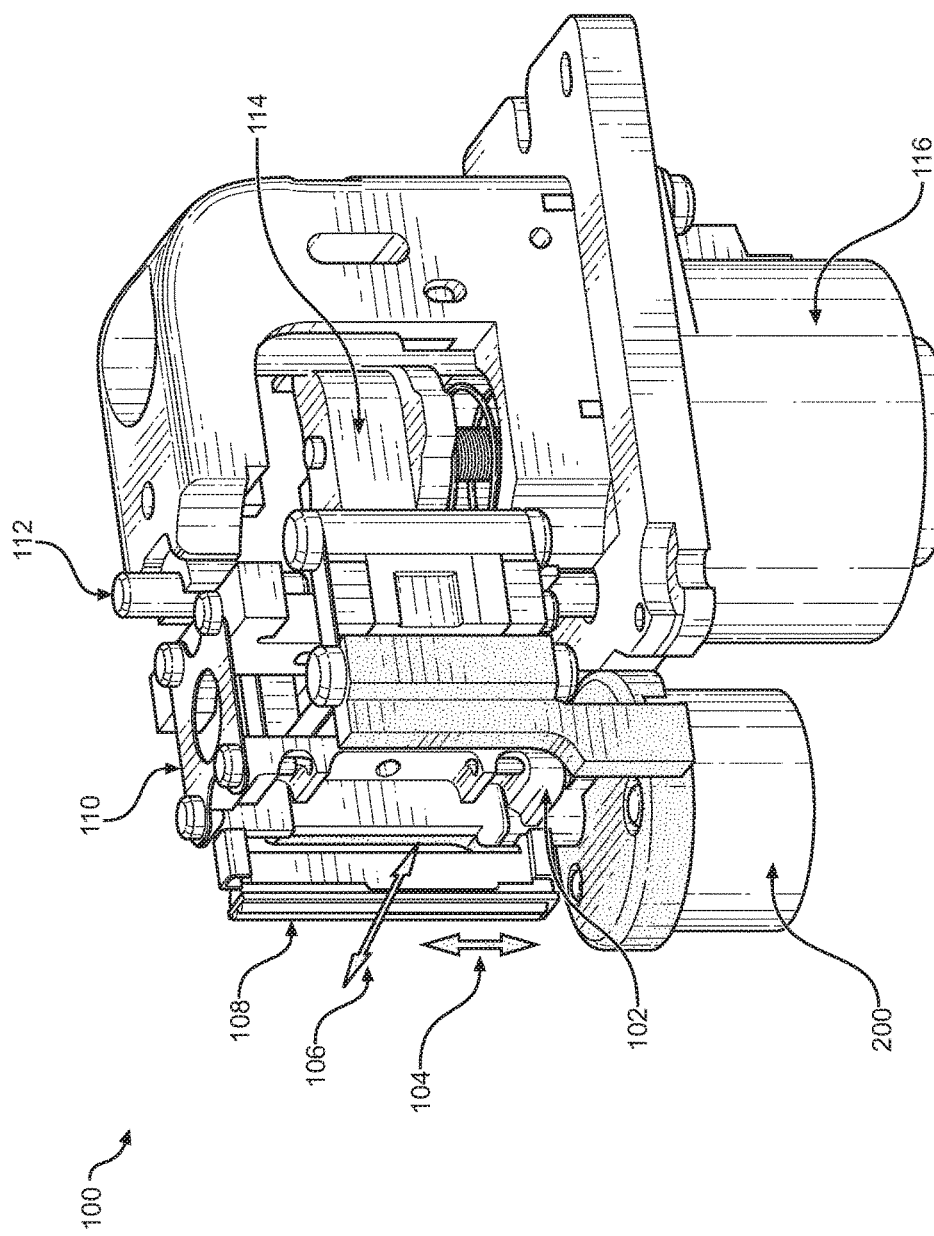

ABSTRACT TEXT FOLLOWS:

DUAL POLE DUAL BUCKING MAGNET LINEAR ACTUATOR

TECHNICAL FIELD

The present disclosure relates to a linear actuator. In particular, the present disclosure relates to a voice coil motor linear actuator for use in a tape drive.

BACKGROUND

A voice coil motor linear actuator uses a coil disposed around a magnet to generate a linear motion. Linear actuators are commonly used in tape drives to move a tape head used to read and/or write to a tape. The tape head is attached to a supporting structure. The linear actuator moves the supporting structure, causing the head to move across the tape. Recording head actuators require high bandwidth linear head motion: the head position changes to keep the head in the correct location on the media must be made quickly. One method to increase the speed by which the head is positioned relative to the media is to increase the force used to drive the head.

In a voice coil motor linear actuator, current is transmitted through the coil, generating a linear force to actuate the head. Typically, the coil is actuated while the magnet is stationary. U.S. Pat. No. 8,422,173 B2 ("the '173 patent," incorporated herein by reference in its entirety) discloses a dual pole magnet linear actuator that includes a stationary coil disposed around an actuated magnet. It is advantageous to actuate the magnet instead of the coil, as actuating the magnet significantly reduces vibrational resonances interfering with the head, as compared to actuating the coil.

In a voice coil motor, the coil may be wrapped around one side of the magnet, and the coil is actuated up and down about one pole of the magnet. Traditional voice coil motors only take advantage of the magnetic flux on one end of the magnet. The '173 patent discloses a dual pole magnet linear actuator that extends the coil about both poles of the magnet, increasing the region in which the motor generates linear force.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1A illustrates a side perspective view of a head actuator assembly in accordance with one or more embodiments;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. HEAD ACTUATOR ASSEMBLY
3. DUAL POLE DUAL BUCKING MAGNET LINEAR ACTUATOR
4. MISCELLANEOUS; EXTENSIONS

1. General Overview

One or more embodiments include a voice coil motor linear actuator for use in a tape drive. The linear actuator includes a coil-and-housing assembly disposed around a magnet assembly. The magnet assembly includes two bucking magnets around a central dual pole magnet. The central magnet and the bucking magnets may be separated by spacers. A housing is disposed around the magnet assembly. Between the housing and the magnet assembly, a dual coil is wound in two opposing directions to generate additive forces on the magnet assembly.

In an embodiment, the magnet assembly generates a magnetic field. The magnetic field, interacting with the current in the dual coil, generates a force on the magnet assembly, causing the magnet assembly to move linearly. The motion of the magnet assembly actuates a recording head, controlling fine motions of the recording head across a tape.

Both poles of the dual pole dual bucking magnet linear actuator generate force. The current flow design of the dual coil allows the excitation forces on both poles of the actuated magnet assembly to be additive. The excited magnet assembly has significantly higher magnetic flux densities moving through the dual coil, as compared to traditional voice coil motors. The increased magnetic flux density in turn creates a significant increase in the output force of the linear actuator, as compared to traditional voice coil motors. The increased output force of the dual pole dual bucking magnet linear actuator increases the bandwidth of the recording head actuator.

One or more embodiments described in this Specification and/or recited in the claims may not be included in this General Overview section.

2. Head Actuator Assembly

Figure 1B:
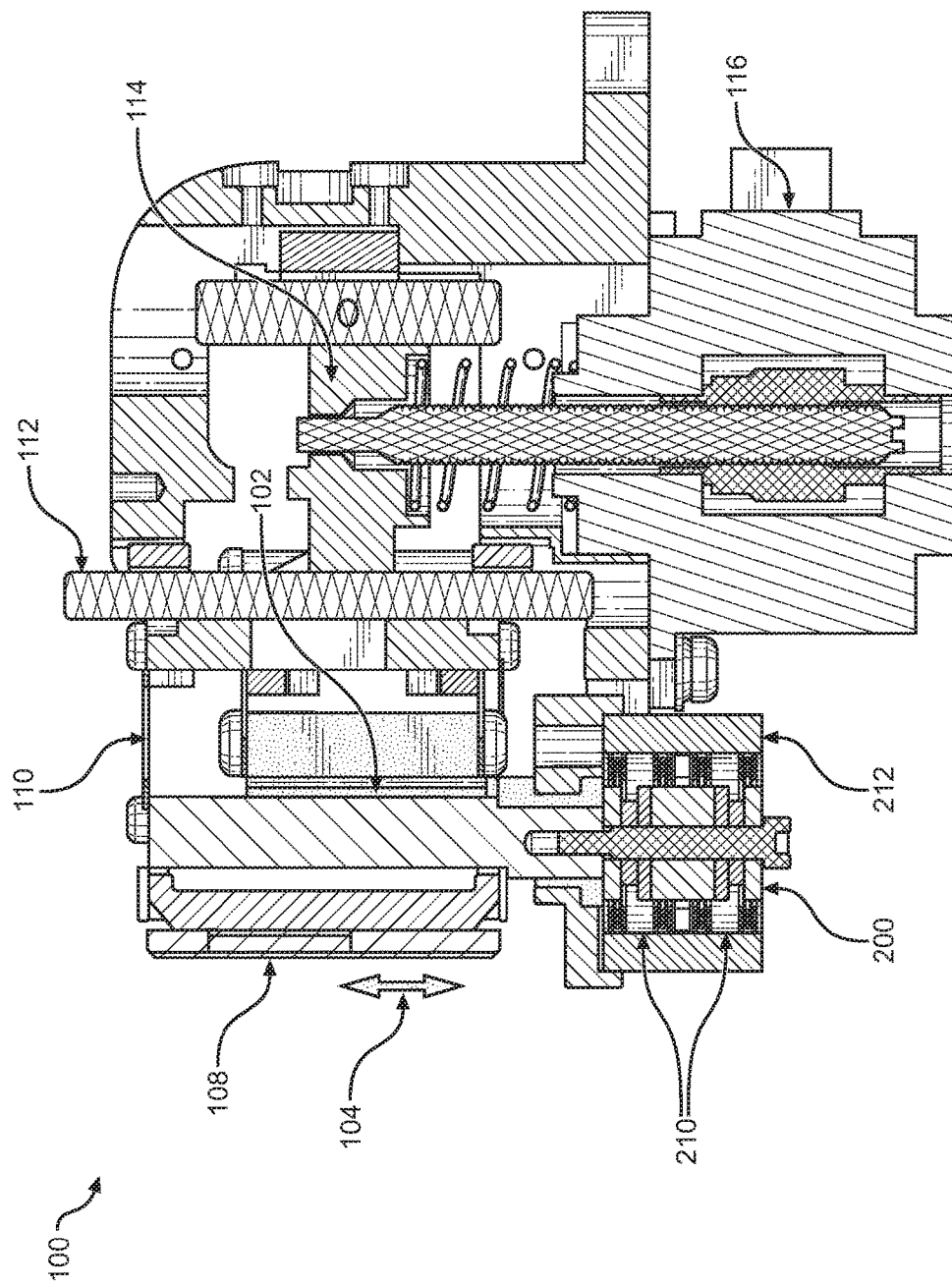
FIG. 1B illustrates a cross-sectional view of a head actuator assembly in accordance with one or more embodiments.

FIGS. 1A and 1B illustrate a head actuator assembly 100 in accordance with one or more embodiments. The head actuator assembly moves a recording head 108 via head carriage 102 using a dual pole dual bucking magnet linear actuator 200 for fine motion. The head actuator assembly 100 uses a coarse actuator motor 116 for coarse motion of the head via coarse travel carriage 114 and coarse guiding shaft 112. In one or more embodiments, the head actuator assembly 100 may include more or fewer components than the components illustrated in FIGS. 1A and 1B.

In an embodiment, the recording head 108 is a magnetic head for reading and/or writing to a tape. A magnetic recording head is constructed, at least in part, of magnetic material. The recording head 108 may generate a magnetic field to affect a paramagnetic recording medium.

In an embodiment, the head carriage 102 is a support structure for the recording head 108. The head carriage holds the recording head 108 in place, and controls the movement of the recording head as the head carriage 102 moves. The head carriage is driven relative to data tracks on tape, to follow a track as the tape moves along the direction indicated by arrow 106. The head carriage is actuated in a substantially vertical direction, as indicated by arrow 104.

In an embodiment, fine guiding flexures 110 mount to the dual pole dual bucking magnet linear actuator 200 and the head carriage 102. The fine guiding flexures 110 guide the recording head, while bending a slight amount. The fine guiding flexures 110 keep the recording head tracking cleanly up and down as the dual pole dual bucking magnet linear actuator 200 pushes the recording head.

In an embodiment, the coarse actuator motor 116 controls coarse motions of the head carriage 102. The coarse actuator motor 116 controls motion of the recording head 108 when the recording head is moved close to a track. The coarse actuator motor 116 may be, for example, a stepper motor, brushless direct current (DC) motor, or voice coil motor. A stepper motor works well because steps can be commanded and counted to track the approximate location on the tape.

In an embodiment, the coarse travel carriage 114 connects the coarse actuator motor 116 to the recording head 108. The coarse travel carriage holds the recording head 108 in place, and controls the movement of the recording head as the coarse travel carriage 114 moves. The coarse actuator motor 116 drives the coarse travel carriage 114, driving the recording head in a substantially vertical direction 104.

In an embodiment, the coarse guiding shaft 112 is used to guide the head linearly up and down. As the coarse guiding shaft 112 guides the head up and down, a back shaft and bushing prevents the head from rotating.

In an embodiment, the dual pole dual bucking magnet linear actuator 200 controls fine motion of the recording head 108. The dual pole dual bucking magnet linear actuator 200 moves the recording head 108 as the recording head follows a track, once the recording head is already close to the track. The dual pole dual bucking magnet linear actuator 200 drives the recording head up and down with quick accelerations, to follow the movement of the tape.

3. DUAL POLE DUAL BUCKING MAGNET LINEAR ACTUATOR

Figure 2A:
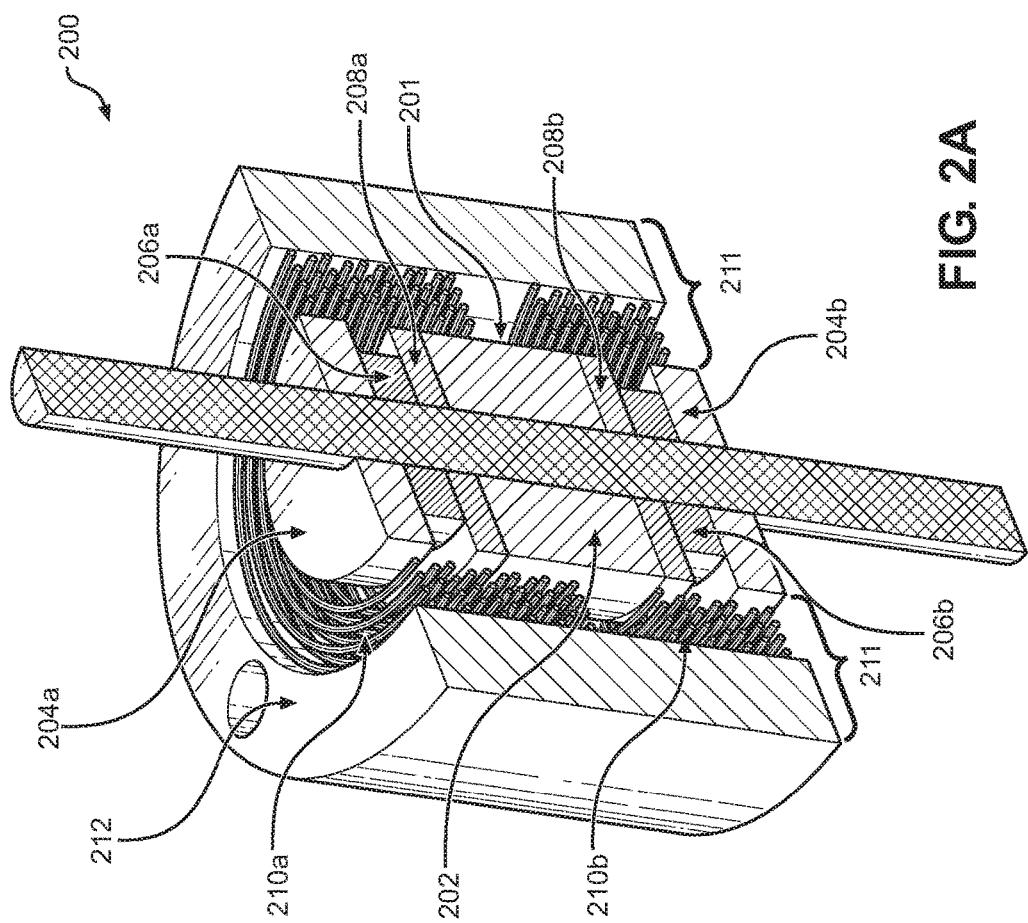
FIG. 2A illustrates an isometric cross-sectional view of a dual pole dual bucking magnet linear actuator in accordance with one or more embodiments.
Figure 2B:
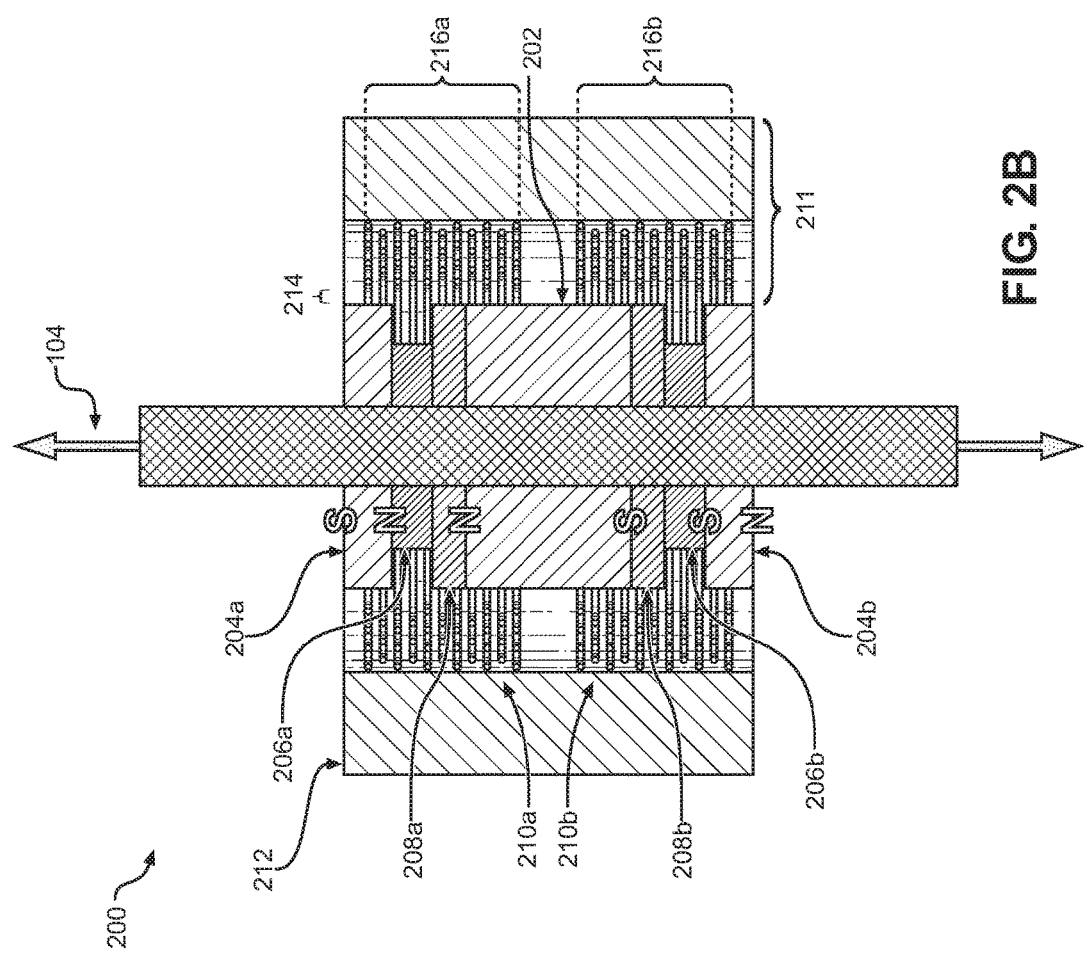
FIG. 2B illustrates a cross-sectional perspective view of a dual pole dual bucking magnet linear actuator in accordance with one or more embodiments.

FIGS. 2A and 2B illustrate a dual pole dual bucking magnet linear actuator 200 in accordance with one or more embodiments. The dual pole dual bucking magnet linear actuator moves a magnet assembly 201 for fine tracking motion of the recording head 108. The magnet assembly is disposed within a coil-and-housing assembly 211. Coil portions 210a, 210b (collectively referred to as dual coil 210) are disposed around the magnet assembly. A housing 212 is disposed around the dual coil and the magnet assembly. The dual pole dual bucking magnet linear actuator 200 may include more or fewer components than the components illustrated in FIGS. 2A and 2B.

Figure 4:
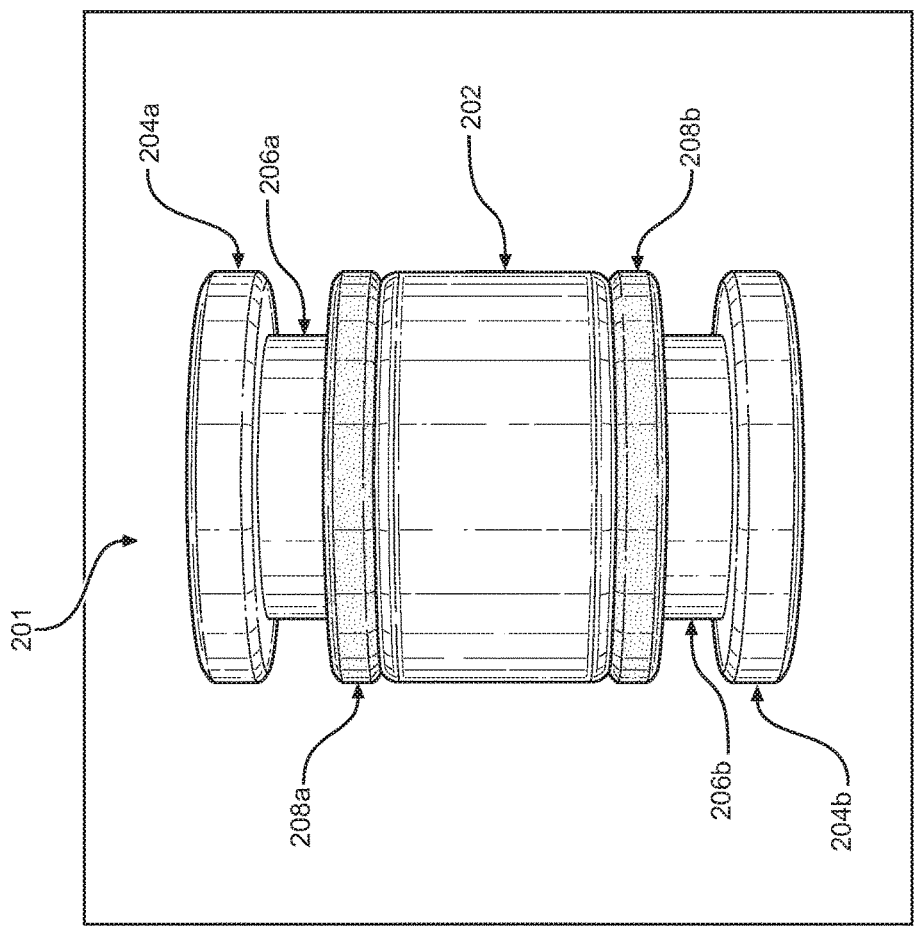
FIG. 4 illustrates a magnet assembly in accordance with one or more embodiments.

In an embodiment, the magnet assembly 201 (also pictured in FIG. 4) comprises several magnets attached to move as one. The magnets may be attached, as nonlimiting examples, by glue, screws, and/or clamps. The magnet assembly 201 shown in FIGS. 2 and 4 is substantially cylindrical in shape. A cylindrical shape creates symmetric flux fields and reduces stray flux. The magnet assembly may be in any desired shape, such as rectangular or hexagonal. The outer diameter of the magnet assembly 201 may be optimally between 6.5 millimeters (mm) and 7.5 mm. The height of the magnet assembly may be between 10 mm and 10.5 mm. The optimal dimensions of the magnet assembly 201 may be scaled up or down depending upon the overall scale of the dual pole dual bucking magnet linear actuator 200.

Electromagnetic forces in the dual pole dual bucking magnet linear actuator 200 actuate the magnet assembly 201 to move the head carriage. A shoulder screw may be disposed through the body of the magnet assembly 201 to connect the magnet assembly to the head carriage. The motion of the magnet assembly 201 controls the fine motion of the head carriage. Moving the magnet assembly 201, as opposed to moving the coil, minimizes out-of-plane resonant vibrations in the system. By minimizing out-of-plane resonant vibrations, the dual pole dual bucking magnet linear actuator 200 drives the recording head while minimizing perturbations to the recording head.

In an embodiment, the central magnet 202 is a permanent magnet with two poles. The poles of the central magnet 202 may be oriented vertically, so that the forces on the magnet are in an up-and-down direction to control vertical recording head motions. As shown in FIG. 2B, the central magnet 202 has a north pole on the top portion of the central magnet and a south pole on the bottom portion of the central magnet. Alternatively, the central magnet 202 may have its south pole on the top portion and its north pole on the bottom portion.

In an embodiment, the pole pieces (e.g., pole pieces 208a, 208b) are pieces of magnetic material disposed at the poles of the central magnet. The pole pieces serve to concentrate the flux emanating from the poles of the central magnet. The pole pieces are composed of magnetically permeable material. Examples of material suitable for pole pieces include, but are not limited to, steel or iron. The pole pieces may be substantially cylindrical in shape, or shaped as appropriate to fit the shape of the central magnet. Alternatively, the system may include a single pole piece at one pole of the central magnet proximate to the recording head.

In an embodiment, the bucking magnets (e.g., bucking magnets 204a, 204b) are auxiliary magnets disposed adjacent to the poles of the central magnet 202. The bucking magnets are attached to the magnet assembly such that the poles of the central magnet face like poles of the bucking magnet(s). As shown in FIGS. 2A and 2B, the system includes two bucking magnets. The north pole of the first bucking magnet 204a is disposed facing the north pole of the central magnet. The south pole of the first bucking magnet 204a is disposed facing out of the magnet assembly. The south pole of the second bucking magnet 204b is disposed facing the south pole of the central magnet. The north pole of the second bucking magnet 204b is disposed facing out of the magnet assembly. The orientation of the bucking magnets may be reversed to align with the poles of the central magnet, if the orientation of the central magnet is reversed.

The bucking magnets concentrate the magnetic field of the central magnet through a path through the coil-and-housing assembly, from (a) in-between the north pole of the first bucking magnet and the north pole of the central magnet to (b) in-between the south pole of the second bucking magnet and the south pole of the central magnet. The greater the magnetic flux along the aforementioned flux path, the greater the actuation force achieved. The greater the actuation force, the greater the acceleration of the recording head. Further, redirecting the magnetic flux path with bucking magnets prevents stray flux from escaping the dual pole dual bucking magnet linear actuator 200. Attenuating stray flux is important in a tape drive system, as the tape and the recording head are sensitive to magnetic perturbances.

The sides of the bucking magnets distal to the central magnet may align horizontally with the top and bottom of the housing 212. Alternatively, the bucking magnets may extend beyond the top of the bottom of the housing. For example, the bucking magnets may extend between 50 and 100 microns outside of the housing. Alternatively, the bucking magnets may stop short of the top of the housing.

Alternatively, the system may include a single bucking magnet. A single bucking magnet may be disposed on the side of the central magnet proximate to the recording head, such that the north poles, or the south poles, of the bucking magnet and the central magnet are facing one another.

In an embodiment, the spacers (e.g., spacers 206a, 206b) are non-magnetically conducting material disposed between the central magnet 202 and the bucking magnet(s). The spacers may be substantially disk-shaped, or the spacers may be shaped as appropriate to fit the shape of the central magnet. The system may include one spacer at one pole of the central magnet, or two spacers at each pole of the central magnet, depending on the number of bucking magnets in use.

The spacers separate the bucking magnets and the central magnet. Separating the bucking magnets from the central magnet increases the force generated by the dual pole dual bucking magnet linear actuator 200. Referring to FIG. 2B, the north pole of the top bucking magnet 204a faces the north pole of the central magnet 202. The south pole of bucking magnet 204a faces up towards the recording head. Magnetic flux from the north pole of the bucking magnet 204a returns to the south pole of the bucking magnet 204a. Absent spacer 206a, the magnetic flux returning to the south pole of the bucking magnet 204a travels across the coil portion 210a, creating an undesirable force on the magnet assembly 201 that is opposite in direction to the desired actuation force. The undesirable force on the magnet assembly 201 may be reduced by separating the bucking magnet 204a from the central magnet 202 with the spacer 206a. The bucking magnet 204a is disposed such that magnetic flux returning to the south pole of the bucking magnet 204a is substantially above the coil portion 210a rather than through the coil portion 210a. Similarly, the lower bucking magnet 204b is spaced apart from the central magnet, so that the return path of magnetic flux to the north pole of bucking magnet 204b is directed substantially below the coil portion 210b.

In another embodiment, the system may be used without the spacers. Force cancellation can be avoided by shortening the coil. However, reducing the height of the dual coil reduces the amount of actuation force over distance achieved by the dual pole dual bucking magnet linear actuator 200.

In an embodiment, the thickness of the spacers maximizes the net magnetic flux through the dual coil while minimizing stray magnetic flux out of the dual pole dual bucking magnet linear actuator. As the bucking magnet is spaced further from a pole piece, the bucking magnet concentrates less magnetic flux through the dual coil. Additionally, as the bucking magnet is spaced farther apart from the central magnet, stray magnetic flux increasingly escapes the dual pole dual bucking magnet linear actuator 200. As the bucking magnet is spaced closer to the pole pieces, the return flux to the outer pole of the bucking magnet flows increasingly through the dual coil, canceling the net magnetic flux in that region of the dual coil. The optimum thickness of the spacers strikes the balance between the above limits. The thickness of the spacers may be optimally between 0.8 millimeters (mm) and 1.2 mm. The optimal spacer thickness may be scaled up or down depending upon the overall scale of the dual pole dual bucking magnet linear actuator 200.

The diameter of the spacers may be less than the diameter of the central magnet and/or bucking magnet(s). Reducing the diameter of the spacer(s) can reduce the mass of the magnet assembly overall, reducing the force required to drive the magnet assembly. Alternatively, the spacers may be of the same diameter as the magnets. The system may include two spacers of equal thickness. Alternatively, the thickness of one spacer may be greater than the thickness of the other spacer. The spacer proximate to the recording head may be slightly thinner than the spacer distal to the recording head.

The spacers are preferably composed of a relatively stiff material to avoid vibrational resonances. Aluminum has been found to perform well as a spacer material, although the spacers may be composed of plastic or any other non-magnetically conducting material. The spacers may, for example, be plastic washers.

Figure 3:
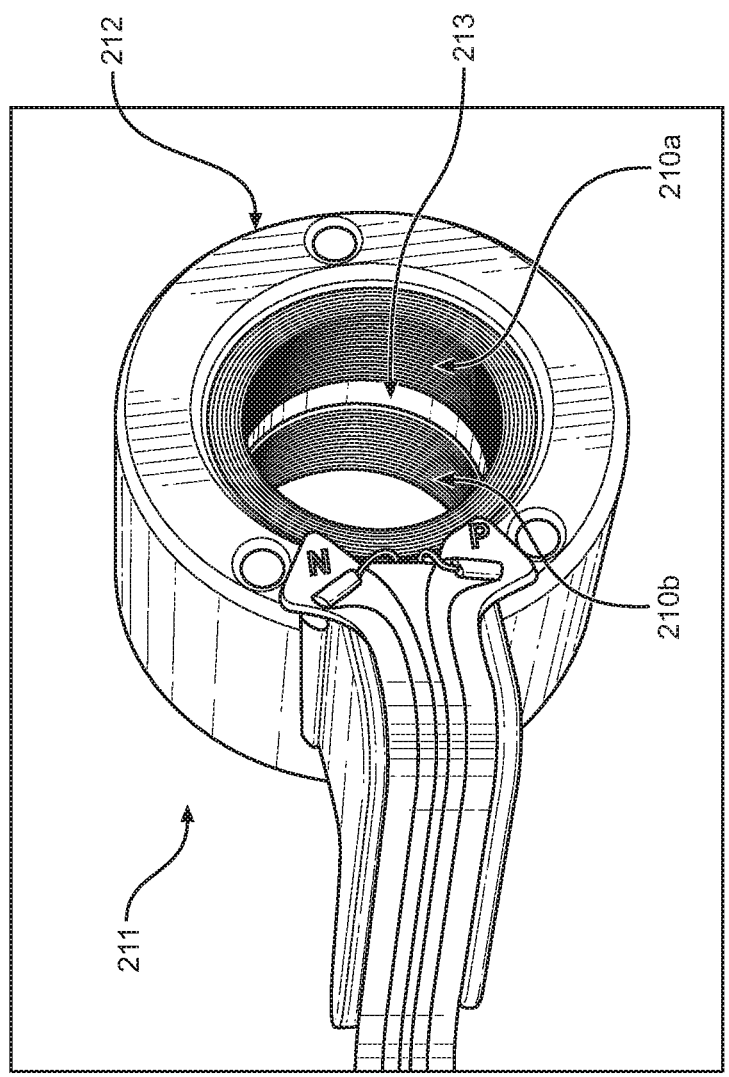
FIG. 3 illustrates a coil-and-housing assembly in accordance with one or more embodiments.

FIG. 3 shows the coil-and-housing assembly 211. The housing 212 may be attached to the dual coil 210, or the dual coil may be suspended within the housing.

In an embodiment, the housing 212 is disposed around the magnet assembly and the dual coil. The housing may be substantially cylindrical, with an outer wall and an inner wall defining a hollow interior. Alternatively, the housing may be in any shape suitable to enclose the magnets. The housing provides a path for the magnetic flux flowing from the north pole of the central magnet to the south pole of the central magnet. The housing 212 traps stray flux to prevent flux from escaping the dual pole dual bucking magnet linear actuator. The housing may be composed of soft magnetic material, such as steel or iron. The housing may be approximately 9 to 11 mm in height, with an outer diameter of 15 to 17 mm and an inner diameter of 10 to 12 mm. The outer wall of the magnet assembly 201 and the inner wall of the housing 212 may be spaced apart by approximately 2.0 mm.

In an embodiment, the gap 214 is the distance between the outer wall of the magnet assembly 201 and the inner wall of the dual coil 210. The smaller the gap 214, the greater the force output. Reducing the gap 214 keeps the flux density across the dual coil up. The flux density across the dual coil increases as the gap size decreases. The size of the gap 214 is limited, however, by the need for the dual coil to be positioned between the magnet assembly and the housing, and the need for the magnet assembly to be free to move relative to the coil-and-housing assembly. A gap of between 0.25 mm and 0.75 mm has been found to concentrate the magnetic flux well while retaining freedom of movement for the magnet assembly. The size of the gap 214 may be 0.5 mm. The size of the gap may scale up or down to fit the overall proportions of the dual pole dual bucking magnet linear actuator.

In an embodiment, the dual coil 210 (coil portions 210a, 210b) is a length of wire wrapped around the magnet assembly. The dual coil remains stationary as the dual pole dual bucking magnet linear actuator is driven. The dual coil may comprise two separate coils (210a, 210b) that are connected to a common circuit. Alternatively, one coil comprising two portions (210a, 210b) may be disposed around the magnet assembly. Coil portions 210a and 210b may be equal in length, or of different lengths. Coil portions 210a and 210b may be separated by a spacer 213.

The dual coil 210 may extend to the top and bottom of the housing and the magnet assembly. Alternatively, the dual coil may be slightly shorter than the housing and the magnet assembly. To protect the dual coil and ensure that the housing traps stray flux, yet keep the dual coil long enough to generate adequate travel in the dual pole dual bucking magnet linear actuator, the dual coil may stop slightly short of the top and bottom of the housing. The dual coil may stop approximately 0.5 mm from the top and bottom of the housing.

In an embodiment, a current is driven in the dual coil 210 via a lead wire. The lead wire is wound in a first direction in the first coil portion 210a. The lead wire is wound in a second direction in the second coil portion 210b. The lead wires come in and around the dual coil such that current flows in a first direction in the first coil portion, and current flows in a second direction in the second coil portion.

In an embodiment, the current in the dual coil flows in opposite directions in the two coil portions, such a direction that the force generated by the current in the first coil portion is additive with the force generated by the current in the second coil portion. The current in the dual coil may flow in a counterclockwise direction in the upper coil portion (current in coil 216a), while the current in the dual coil flows in a clockwise direction in the lower coil portion (current in coil 216b). Dual current generates a net force that is additive as a function of the changing direction of the magnetic flux through the dual coil. The current may be reversed in the dual coil to reverse the direction of motion of the magnet assembly. The current flow design of the dual coil allows the excitation forces on both poles of the actuated magnet assembly to be additive. The excited dual pole dual bucking magnet linear actuator 200 has significantly higher magnetic flux densities moving through the dual coil than in a single coil linear actuator.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A linear actuator comprising:
    a magnet assembly, the magnet assembly comprising:
        a central magnet comprising a north pole and a south pole;
        a pair of bucking magnets disposed on opposite ends of the central magnet, the pair of bucking magnets comprising a first bucking magnet and a second bucking magnet;
        wherein the first bucking magnet is disposed adjacent to the central magnet such that a north pole of the first bucking magnet faces the north pole of the central magnet;
        wherein the second bucking magnet is disposed adjacent to the central magnet such that a south pole of the second bucking magnet faces the south pole of the central magnet;
    a coil-and-housing assembly, the coil-and-housing assembly comprising:
        first coil portion disposed around a first portion of the central magnet and at least a portion of the first bucking magnet;
        a second coil portion disposed around a second portion of the central magnet and at least a portion of the second bucking magnet;
        a housing disposed around both the first coil portion and the second coil portion, the housing comprising (a) an inner wall facing the first coil portion and the second coil portion and (b) an outer wall;
    wherein a current flowing in the first coil portion is in an opposite direction of a current flowing in the second coil portion.

2. The linear actuator of claim 1, wherein magnetic flux flows, through the coil-and-housing assembly, from (a) in-between the north pole of the first bucking magnet and the north pole of the central magnet to (b) in-between the south pole of the second bucking magnet and the south pole of the central magnet.

3. The linear actuator of claim 1, wherein the magnet assembly is actuated in response to the current flowing in the first coil portion and the second coil portion.

4. The linear actuator of claim 1, further comprising:
    a first spacer disposed between (a) the north pole of the central magnet and (b) the first bucking magnet; and
    a second spacer disposed between (a) the south pole of the central magnet and (b) the second bucking magnet.

5. The linear actuator of claim 4, wherein:
    a thickness of the first spacer is in a range from 0.8 millimeters to 1.2 millimeters; and
    a thickness of the second spacer is in a range from 0.8 millimeters to 1.2 millimeters.

6. The linear actuator of claim 4, wherein:
a diameter of the first spacer is less than a diameter of the central magnet; and
a diameter of the second spacer is less than a diameter of the central magnet.

7. The linear actuator of claim 4, wherein a thickness of the first spacer is substantially equal to a thickness of the second spacer.

8. The linear actuator of claim 4, wherein a thickness of the first spacer is greater than a thickness of the second spacer.

9. The linear actuator of claim 4, wherein the first spacer and the second spacer are composed of non-magnetically conducting material.

10. The linear actuator of claim 4, wherein the first spacer and the second spacer are composed of aluminum.

11. The linear actuator of claim 1, further comprising:
a first pole piece attached at the north pole of the central magnet; and
a second pole piece attached at the south pole of the central magnet.

12. The linear actuator of claim 11, further comprising:
a first spacer disposed between (a) the first pole piece and (b) the first bucking magnet; and
a second spacer disposed between (a) the second pole piece and (b) the second bucking magnet.

13. The linear actuator of claim 1, wherein a space between (a) an outer wall of the magnet assembly and (b) an inner wall of the first coil portion is in a range from 0.25 millimeters to 0.75 millimeters.

14. The linear actuator of claim 1, wherein the central magnet is a permanent magnet.

15. The linear actuator of claim 1, wherein the first coil portion and the second coil portion are separated by a spacer.

16. A method for operating a linear actuator,
wherein the linear actuator comprises:
a magnet assembly, the magnet assembly comprising:
a central magnet comprising a north pole and a south pole;
a pair of bucking magnets disposed on opposite ends of the central magnet, the pair of bucking magnets comprising a first bucking magnet and a second bucking magnet;
wherein the first bucking magnet is disposed adjacent to the central magnet such that a north pole of the first bucking magnet faces the north pole of the central magnet;
wherein the second bucking magnet is disposed adjacent to the central magnet such that a south pole of the second bucking magnet faces the south pole of the central magnet;
a coil-and-housing assembly, the coil-and-housing assembly comprising:
a first coil portion disposed around a first portion of the central magnet and at least a portion of the first bucking magnet;
a second coil portion disposed around a second portion of the central magnet and at least a portion of the second bucking magnet;
a housing disposed around both the first coil portion and the second coil portion, the housing comprising (a) an inner wall facing the first coil portion and the second coil portion and (b) an outer wall;
the method comprising the steps of:
transmitting current through the first coil portion and the second coil portion such that:
(a) the current flowing in the first coil portion is in an opposite direction of the current flowing in the second coil portion;
(b) causing magnetic flux to flow, through the coil-and-housing assembly, from (a) in-between the north pole of the first bucking magnet and the north pole of the central magnet to (b) in-between the south pole of the second bucking magnet and the south pole of the central magnet; and
(c) causing the magnet assembly to actuate.

17. The method of claim 16, wherein the linear actuator further comprises:
a first spacer disposed between (a) the north pole of the central magnet and (b) the first bucking magnet; and
a second spacer disposed between (a) the south pole of the central magnet and (b) the second bucking magnet.

18. The method of claim 17, wherein:
a thickness of the first spacer is in a range from 0.8 millimeters to 1.2 millimeters; and
a thickness of the second spacer is in a range from 0.8 millimeters to 1.2 millimeters.

19. The method of claim 16, wherein the linear actuator further comprises:
a first pole piece attached at the north pole of the central magnet; and
a second pole piece attached at the south pole of the central magnet.

20. The method of claim 19, wherein the linear actuator further comprises:
a first spacer disposed between (a) the first pole piece and (b) the first bucking magnet; and
a second spacer disposed between (a) the second pole piece and (b) the second bucking magnet.

* * * * *